Patented Mar. 11, 1947

2,417,380

UNITED STATES PATENT OFFICE 2,417,380

PROCESS FOR THE PREPARATION OF α-NITRO-ISOBUTENE

Arthur Ernest Wilder Smith and Charles William Scaife, Norton-on-Tees, England, assignors to Imperial Chemical Industries Limited, a corporation of Great Britain No Drawing. Application February 22, 1945, Serial No. 579,310. In Great Britain March 13, 1944

8 Claims. (Cl. 260—644)

1

This invention relates to a process for the preparation of α-nitro-isobutene.

According to the invention there is provided a process for the production of α-nitro-isobutene which comprises treating 1,2-dinitro-isobutane in the presence of water with one or more of the basic substances: urea, the oxides, hydroxides, carbonates (including bicarbonates and basic carbonates where they exist) of the alkali metals, ammonium, alkaline earth metals, magnesium and lead, and the oxide, hydroxide, carbonate and basic carbonate of zinc. Basic substances freely soluble in water are preferred because they give faster reaction. Preferably the selected basic substance is used in an amount equivalent to one mole of nitrous acid produced per mole of 1,2-dinitro-isobutane, although a larger amount than this may also be used. When a mixture of substances is used, an amount of the mixture equivalent to one mole of nitrous acid per mole of 1,2-dinitro-isobutane should be used.

The before-mentioned substances may be used in solution or in suspension and the treatment may be carried out either at room temperature or in the warm. A reaction temperature of about 20° C. is very suitable. Temperatures approaching the boiling point of water, however, should be avoided since they tend to produce undesirable decomposition of the 1,2-dinitro-isobutane and α-nitro-isobutene.

The α-nitro-isobutene can be separated from the reaction products by extracting the latter several times with a volatile solvent, e. g. methylated ether, drying the extract, for example, over sodium sulphate, removing the solvent by distillation, and distilling the residue under reduced pressure.

The preferred basic substances are the oxides and hydroxides of the alkali metals and ammonium, and ammonium bicarbonate. Urea, the carbonates of the alkali metals and ammonium, and the bicarbonates of the alkali metals are only a little less efficient. It will generally be desirable to carry out the reaction in the presence of an excess of water, relative to the 1,2-dinitro-isobutane. Good results can be obtained by using water as the sole medium and employing the 1,2-dinitro-isobutane as a suspension in it, but a solvent for the 1,2-dinitro-isobutane may be present if desired. It will generally be preferable to employ the 1,2-dinitro-isobutane in comminuted form. In carrying out the reaction it is desirable to stir the reaction mixture.

In the reaction a small amount—generally less than 10%—of 1-nitro 2-methyl propene-2 is produced. For many purposes it is unnecessary to free the α-nitro-isobutene from this, but when pure α-nitro-isobutene is required it can be produced by fractional distillation of the product of the above process at reduced pressure, employing a column with a sufficient number of plates, or an equivalent packed column. At substantially 15 mm. of mercury 1-nitro 2-methyl propene-2 distils off at 40–43° C. and α-nitro-isobutene at 59–62° C.

The invention is illustrated but not limited by the following examples:

Example 1

10.0 gms. of crystalline 1,2-dinitro-isobutane were suspended in 100 ccs. water at room temperature, and a solution of 3.6 gms. of sodium carbonate in 20 ccs. water added with stirring. After standing overnight, the mixture was extracted three times with 30 ccs. methylated ether, and the ether extract dried over sodium sulphate. After removing the ether by distillation the residue was distilled under reduced pressure giving a distillate consisting of 2.2 gms. α-nitro-isobutene.

Example 2

10.0 gms. of 1,2-dinitro-isobutane were suspended in 100 ccs. water and 6.75 gms. calcium carbonate added. After stirring for 20 hours the mixture was treated as in Example 1, and yielded 0.75 gms. α-nitro-isobutene.

Example 3

10.0 gms. of 1,2-dinitro-isobutane were suspended in 100 ccs. water and 5.67 gms. sodium bicarbonate added with stirring. After 40 minutes the solution was treated as in Example 1, and yielded 1.1 gms. α-nitro-isobutene.

Example 4

10.0 gms. of 1,2-dinitro-isobutane were suspended in 100 ccs. water and 4.98 gms. strontium carbonate added with stirring. After 3 hours the solution was treated as in Example 1, and yielded 1.35 gms. α-nitro-isobutene.

Example 5

16.3 gms. of 1,2-dinitro-isobutane were suspended in 160 ccs. water and 8.71 gms. ammonium bicarbonate added. After stirring for 1½ hours the solution was treated as in Example 1, and yielded 8.22 gms. α-nitro-isobutene.

Example 6

10.0 gms. of 1,2-dinitro-isobutane were suspended in 100 ccs. water and 1.9 gms. calcium oxide suspended in 20 ccs. water were added, with stirring. After 6 hours, the mixture was treated as in Example 1, and yielded 1.43 gms. α-nitro-isobutene.

Example 7

10.0 gms. of 1,2-dinitro-isobutane were suspended in 100 ccs. of water and 2.74 gms. zinc oxide added with stirring. After 5 hours the mixture was treated as in Example 1, and yielded 1.96 gms. α-nitro-isobutene.

Example 8

10.0 gms. of 1,2-dinitro-isobutane were suspended in 100 ccs. of water and 3.85 gms. of ammonium carbonate added. After stirring for 1 hour the solution was treated as in Example 1, and yielded 2.15 gms. α-nitro-isobutene.

Example 9

100 gms. of 1,2-dinitro-isobutane were suspended in 200 ccs. water and 27 gms. of sodium hydroxide dissolved in 100 ccs. of water added with stirring over ¼ hour. After ½ hour the solution was treated as in Example 1, and yielded 53.7 gms. of α-nitro-isobutene.

We claim:

1. A process for the production of alpha-nitro-isobutene which comprises treating 1,2-dinitro-isobutane in the presence of water with at least one basic substance selected from the group consisting of the oxides, hydroxides, carbonates and bicarbonates of the alkali metals and alkaline earth metals and ammonium hydroxide and ammonium carbonate.

2. A process according to claim 1 where the total amount of such basic substance used is at least stoichiometrically equivalent to the amount of 1,2-dinitro-isobutane reactant used.

3. A process according to claim 1 where the treatment is carried out at a temperature lower than 100° C.

4. A process according to claim 1 including the steps of separating the alpha-nitro-isobutene with a volatile solvent, drying the extract, removing the volatile solvent by distillation and distilling the residue under reduced pressure.

5. A process according to claim 1 where the alpha-nitro-isobutene is separated from the reaction products by extracting alpha-nitro-isobutene with a volatile solvent, drying the extract, removing the volatile solvent by distillation, distilling the residue under reduced pressure, and fractionally distilling the product under reduced pressure to remove 1-nitro-2-methyl propene-2.

6. A process for the production of alpha-nitro-isobutene which consists of treating 1,2-dinitro-isobutane in the presence of water with an alkali metal hydroxide.

7. A process for the production of alpha-nitro-isobutene which consists of treating 1,2-dinitro-isobutane in the presence of water with ammonium hydroxide.

8. A process for the production of alpha-nitro-isobutene which consists of treating 1,2-dinitro-isobutane in the presence of water with ammonium bicarbonate.

ARTHUR ERNEST WILDER SMITH.
CHARLES WILLIAM SCAIFE.

REFERENCES CITED

The following references are of record in the file of this patent:

Hass et al., "Chemical Reviews," vol. 32, page 411 (1943).